(12) United States Patent
Griessnig

(10) Patent No.: US 8,217,762 B2
(45) Date of Patent: *Jul. 10, 2012

(54) METHOD FOR USING A MOBILE CONTROL DEVICE

(75) Inventor: Gerhard Griessnig, Graz (AT)

(73) Assignee: Siemens Aktiengesellschaft, München (DE)

( * ) Notice: Subject to any disclaimer, the term of this patent is extended or adjusted under 35 U.S.C. 154(b) by 947 days.

This patent is subject to a terminal disclaimer.

(21) Appl. No.: 12/220,461

(22) Filed: Jul. 24, 2008

(65) Prior Publication Data

US 2009/0033471 A1 Feb. 5, 2009

(30) Foreign Application Priority Data

Aug. 2, 2007 (EP) .................................. 07015223

(51) Int. Cl.
*H04Q 5/22* (2006.01)

(52) U.S. Cl. ..................... 340/10.41; 340/1.1; 340/10.1; 340/10.2; 340/10.4; 340/572.1; 701/23; 701/300; 318/16; 318/568.1; 318/587

(58) Field of Classification Search ............... 340/10.41, 340/10.4, 1.1, 10.1, 10.2, 572.1; 701/23, 701/208, 253, 300; 318/16, 472.02, 568.1, 587, 471, 472, 567, 568
See application file for complete search history.

(56) References Cited

U.S. PATENT DOCUMENTS

| | | | | |
|---|---|---|---|---|
| 6,049,745 | A * | 4/2000 | Douglas et al. | 701/23 |
| 6,717,382 | B2 * | 4/2004 | Graiger et al. | 318/587 |
| 2001/0035729 | A1 | 11/2001 | Graiger et al. | |
| 2003/0061295 | A1 * | 3/2003 | Oberg et al. | 709/208 |
| 2007/0297890 | A1 | 12/2007 | Sjoberg et al. | |

FOREIGN PATENT DOCUMENTS

| | | |
|---|---|---|
| EP | 1 479 964 A2 | 11/2004 |
| EP | 1 672 385 A1 | 6/2006 |
| WO | WO 2006/000571 A1 | 1/2006 |
| WO | WO 2006/105567 A2 | 10/2006 |
| WO | WO 2007/025879 A1 | 3/2007 |

* cited by examiner

*Primary Examiner* — George Bugg
*Assistant Examiner* — Sisay Yacob

(57) ABSTRACT

There is described method for using a mobile control device that serves for controlling a machine within an assigned effective range which is only partially delimited by one or more RFID transponders and has protective measures. Control commands of the control device are also executed when it does not receive any valid transponder data, but the controller has received a corresponding signal.

4 Claims, 1 Drawing Sheet

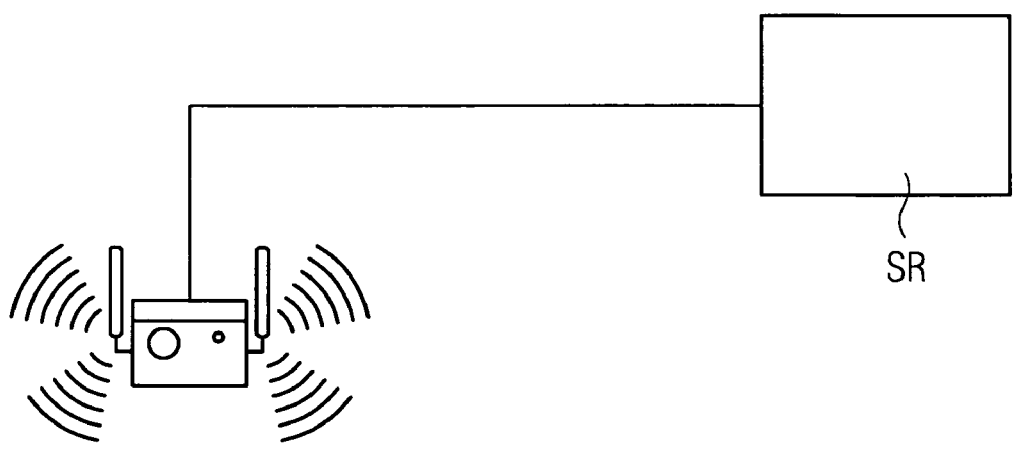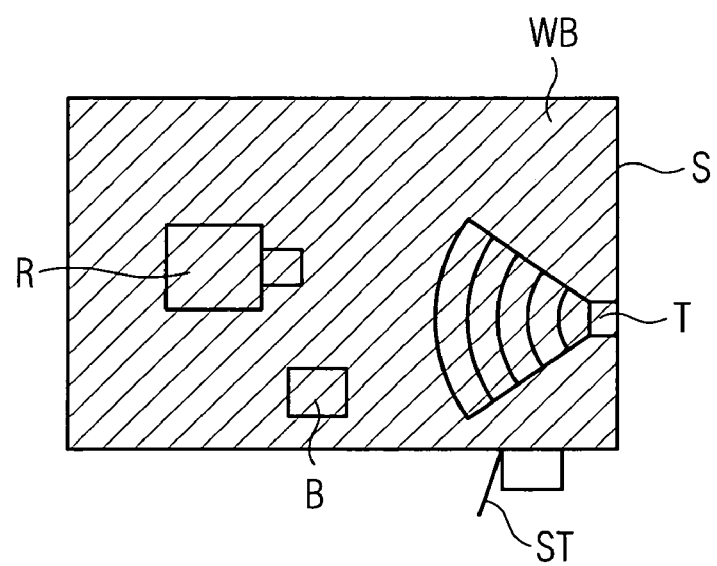

METHOD FOR USING A MOBILE CONTROL DEVICE

CROSS REFERENCE TO RELATED APPLICATIONS

This application claims priority of European Patent Office application No. 07015223.6 EP filed Aug. 2, 2007, which is incorporated by reference herein in its entirety.

FIELD OF INVENTION

The invention relates to a method for using a mobile control device that serves for controlling at least one machine within an assigned effective range.

BACKGROUND OF INVENTION

It is not permissible to perform dangerous actions on machines/installations in a safety-relevant environment from any location. Controlling said installations was possible until now only at stationary points or using wired devices. However, these limiting factors have been removed as a result of wireless transmission technologies. In order to fulfill safety engineering requirements, zones must be technically defined and a unique assignment to said zones must take place. It is already known to define corresponding effective ranges within which a machine can be controlled wirelessly by means of a control device. In such cases the effective ranges are delimited by one or more RFID (Radio Frequency IDentification) transponders. High requirements in terms of safety are imposed on the use of such control devices in connection with the function of the effective ranges.

In order to be able to read or evaluate the RFID transponders, line-of-sight contact is usually necessary between the control device and the RFID transponder. In many cases, e.g. in large machines into which the user climbs, it is not possible or, as the case may be, necessary to cover the entire safety-relevant effective range with corresponding RFID transponders. For example, the safety-relevant effective ranges can be circumscribed by means of fences.

SUMMARY OF INVENTION

An object underlying the invention is to propose a method of the aforementioned kind wherein the effective range is only partially covered by means of RFID transponders and yet the availability of the control device is to be present over the entire effective range.

This object is achieved by a method having the features recited in an independent claim. Advantageous developments of the invention may be derived from the dependent claims.

BRIEF DESCRIPTION OF THE DRAWINGS

An exemplary embodiment of the method according to the invention is explained in more detail below with reference to a drawing.

DETAILED DESCRIPTION OF INVENTION

The figure shows an effective range WB which is delimited by means of a safety fence S and in which robots or other machines R are located. When a person enters the effective range WB by way of a safety gate ST, the robots or machines R, for example, are transferred to a state that is less dangerous for the person, i.e. protective measures to safeguard the person come into effect. Entry into the effective range WB is signaled to a controller SR by way of the safety gate ST or via means triggering other protective measures. In this way an improper or erroneous use of the below-described override function is prevented. In order to control the robots or machines R by means of a control device B the user registers the control device B following reception of valid transponder data from an RFID transponder T which, however, only partially covers the effective range WB. For that purpose the control device B receives radio signals of the RFID transponder T and determines therefrom the identification number ID and the distance of the RFID transponder B and transmits the measured data after the latter has been checked via a wireless communications link, e.g. a WLAN connection, to the controller SR. The controller SR executes control commands received from the control device B for the purpose of controlling the machines R usually only for as long as the control device B receives valid transponder data, i.e. an identification number ID and a valid distance value for the RFID transponder T, i.e. while the control device B is registered for said effective range WB. The maximum distance value is recorded for the respective RFID transponder T, i.e. valid distance values are correspondingly smaller than said maximum distance value.

In the present exemplary embodiment, however, the effective range WB is only partially spanned by one or more RFID transponders T. There are points in the effective range WB defined by the safety fence S at which the RFID transponder T is not visible from the control device B, i.e. at which it is no longer possible to receive valid transponder data. To ensure that it is also possible in this situation to issue control commands for machines R in this effective range WB by means of the control device B, an override function is provided by means of which the usual aforementioned mode for the registration in the effective range WB is suspended. For this purpose the controller SR is signaled by the user of the control device B, e.g. by means of a switch signal, that the function of the control device B is to be maintained even if no further valid transponder data is received. On the other hand, in order to ensure safety-relevant control, means, e.g. a photoelectric relay, are used by means of which the override function is disabled when the effective range WB is left. The controller SR receives a signal to cancel the override function via the photoelectric relay.

The invention claimed is:

1. A method for using a mobile control device that serves for controlling at least one machine, comprising:
controlling the at least one machine within an effective range;
partially delimiting the effective range by one or more RFID transponders;
registering a control device in the effective range based upon transponder data which the control device receives from the one or more RFID transponders;
receiving a control command by a controller for controlling the at least one machine, wherein the controller receives the control command from the control device via a wireless communications link; and
executing the control command by the controller
wherein, when the control device, although located within the effective range, does not receive the transponder data, the controller executes the control command received from the control device after the controller has received a signal from the control device indicating that the control device did not receive the transponder data.

2. The method as claimed in claim 1, wherein the transponder data include an identification number and a valid distance value for the RFID transponder.

3. The method as claimed in claim 1, wherein a departure from the effective range only partially spanned by RFID transponders is signaled to the controller.

4. The method as claimed in claim 2, wherein a departure from the effective range only partially spanned by RFID transponders is signaled to the controller.

* * * * *